（12）United States Patent
Hutton

(10) Patent No.: US 6,745,423 B1
(45) Date of Patent: Jun. 8, 2004

(54) PASSENGER BOARDING BRIDGE WITH LATERALLY ADJUSTABLE CAB PORTION

(75) Inventor: Neil Hutton, Ottawa (CA)

(73) Assignee: DEW Engineering and Development Limited, Ottawa (CA)

( * ) Notice: Subject to any disclaimer, the term of this patent is extended or adjusted under 35 U.S.C. 154(b) by 0 days.

(21) Appl. No.: 10/382,525

(22) Filed: Mar. 7, 2003

(51) Int. Cl.⁷ .................................................. E01D 1/00
(52) U.S. Cl. ........................................................ 14/71.5
(58) Field of Search ................................ 14/69.5, 71.1, 14/71.3, 71.5

(56) References Cited

U.S. PATENT DOCUMENTS 5,761,757 A * 6/1998 Mitchell et al. .............. 14/71.5
6,122,789 A    9/2000 Stephenson et al.
6,195,826 B1 * 3/2001 LeBaron et al. .............. 14/71.5
6,543,076 B1 * 4/2003 Worpenberg et al. ........ 14/71.5

* cited by examiner

Primary Examiner—Gary S Hartmann
(74) Attorney, Agent, or Firm—Freedman & Associates

(57) ABSTRACT

A cab for a commercial aircraft passenger boarding bridge includes a passageway having a floor, a ceiling opposing the floor, a first sidewall, and a second sidewall opposing the first sidewall. A second frame is coupled to the first sidewall and a first frame is coupled to at least one of the floor, the ceiling, and the second sidewall. At least one of the first and second frames are for being attached to the walkway opposite end in a manner to support lateral movement of the second frame relative to the walkway opposite end and relative to the first frame, so as to permit lateral movement of the first sidewall relative to the at least one of the floor, the ceiling, and the second sidewall.

12 Claims, 9 Drawing Sheets

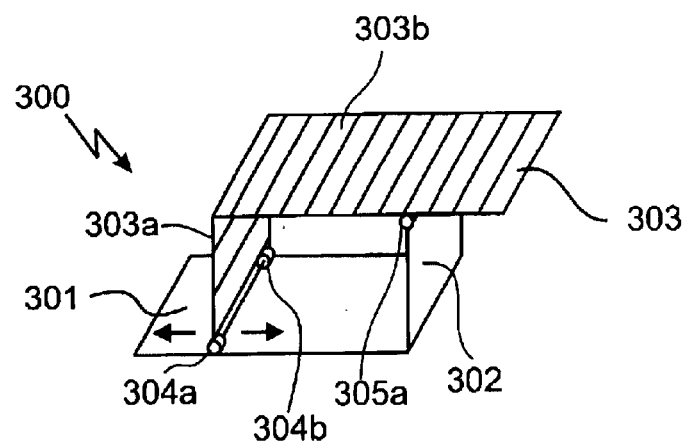
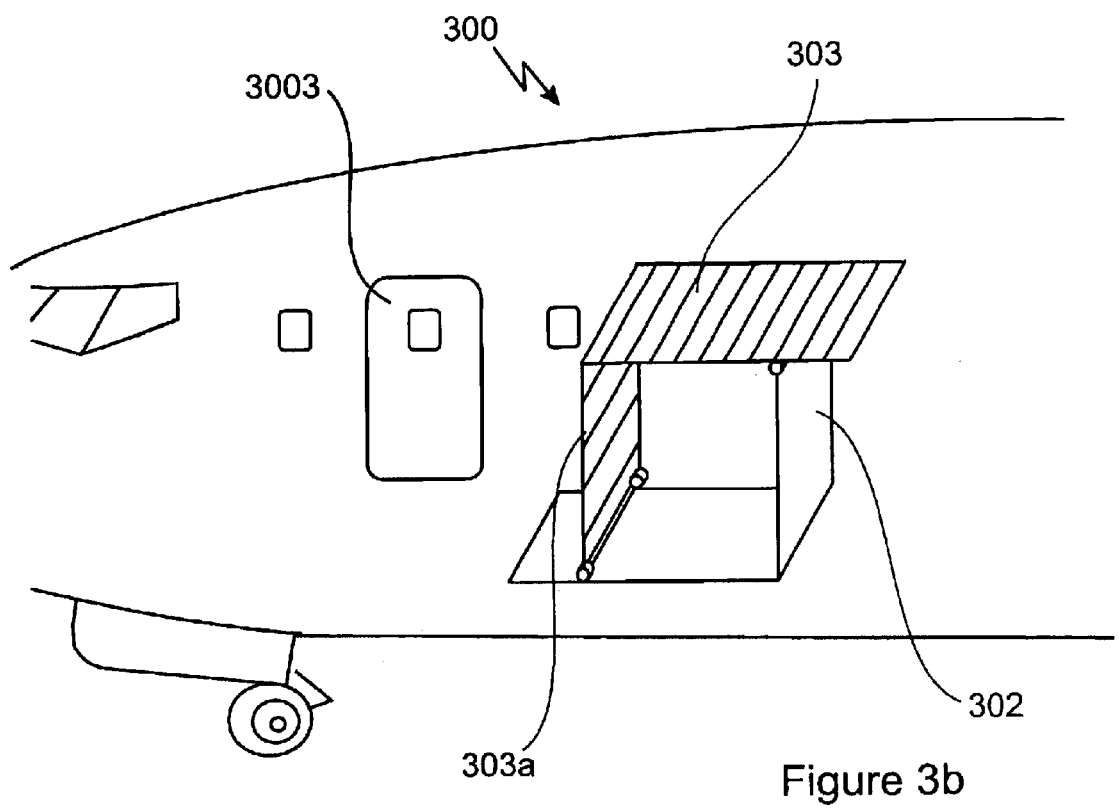
Figure 3a
Figure 3b

PASSENGER BOARDING BRIDGE WITH LATERALLY ADJUSTABLE CAB PORTION

FIELD OF THE INVENTION

The present invention relates generally to passenger boarding bridges for transferring passengers between an aircraft and a terminal building, and more particularly to passenger boarding bridges including a laterally adjustable cab.

BACKGROUND OF THE INVENTION

In order to make aircraft passengers comfortable, and in order to transport them between an airport terminal building and an aircraft in such a way that they are protected from the weather and from other environmental influences, passenger boarding bridges are used, which can be telescopically extended, and the height of which is adjustable. For instance, an apron drive bridge in present day use has a plurality of adjustable modules, including: a rotunda, a telescopic tunnel, a bubble section, a cab, and elevating columns with wheel carriage. Typically, one elevating column is mounted adjacent to each lateral surface of the telescopic tunnel. Manual, semi-automated and fully-automated alignment systems are known in the art for adjusting the position of the passenger boarding bridge relative to an aircraft, for instance to compensate for different sized aircraft and to compensate for imprecise parking of an aircraft at an airport terminal. Of course, other types of bridges are known in the art, such as for instance pedestal bridges and over-the-wing (OTW) bridges.

The elevating columns are used to adjust the height of an outboard end of the passenger boarding bridge so that the cab engages a doorway of each different type of aircraft at a proper height. After the cab is positioned to the proper height, the elevating columns are used to support the telescopic tunnel in such a way that an approximately level surface is maintained between the doorway of the aircraft and the cab of the passenger boarding bridge. However, even after the cab is positioned at proper height, it is not a given that the cab is also positioned at a desired lateral position. In general, the need for an adequate line-up with an aircraft outlet determines the lateral positioning of the cab. The cab and the doorway of the aircraft must align in a proper fashion, so as to ensure safe boarding and deplaning of passengers. This prerequisite calls for a precise docking of the passenger boarding bridge to the aircraft, which in turn requires a considerable amount of time, since various precautious measures have to be taken to successfully complete the maneuver.

A precise alignment method for the cab attached to a passenger boarding bridge would greatly facilitate the docking of a passenger boarding bridge to an aircraft. Typically, in a first docking step, the passenger boarding bridge would be brought into a position of approximate alignment of the cab with a doorway of the aircraft. In a second docking step, a fine alignment is achieved by laterally adjusting the position of the cab of the passenger boarding bridge. The possibility of lateral adjustment of the cab portion also allows for a use of the passenger boarding bridge with a wide range of aircrafts, ranging from large jet airplanes to small commuter airplanes.

Passenger boarding bridges having laterally adjustable cab portions are known in the art. In U.S. Pat. No 6,122,789 to Stephenson and Telford, issued Sep. 26, 2000, there is disclosed a typical aircraft passenger boarding bridge including a walkway having a first end and a second end, the first end for connecting to an airport building; a cab portion connected to the second end of the walkway for connecting to an airplane. The cab portion is connected to the passenger boarding bridge via a sliding mechanism for allowing the cab portion to slide laterally. Further, the cab portion includes retractable floor members. The sliding mechanism and the retractable floor members allow the aircraft passenger boarding bridge to be used for both commuter aircrafts and jet airplanes. Preferably, there are at least two retracting floor members, one for each railing of the stairway of a commuter aircraft. Preferably, there is also a retracting floor member between the two retracting floor members for each railing, approximately the width of the space between the two railings.

It is a disadvantage of the system described in the prior art that the cab as whole has to be moved when performing a fine-tuning alignment. This requires a precise first alignment action, since the range of the fine-tuning motion is restricted due to the fact that the unwieldy cab portion has to be moved. Also, the sliding mechanism only allows for a positioning of the cab, but does not allow for example for adjusting the size of a passenger boarding bridge cab. A passenger boarding bridge cab that is adjustable in size would for example be of advantage when boarding bulky objects such as a stroller. Further, the prior art cab includes retractable floor members in order to provide the cab with a possibility to be used with all kind of aircrafts, including such aircrafts which feature automatically deploying stair sets. However, the retractable floor members introduce another degree of freedom when adjusting the cab for aligning, making the alignment process more complex. Not only is a lateral displacement needed, but also an additional floor member shift in a direction substantially perpendicular to the lateral motion is required. It would be advantageous if all the adjustment necessary to prepare the cab for aligning with a doorway for any kind of aircraft would be achieved by one type of displacing motion only.

It is therefore an object of the present invention to provide a passenger boarding bridge having an adjustable cab that overcomes the drawbacks of the prior art devices.

SUMMARY OF THE INVENTION

The invention provides a cab for serving as a portal between an aircraft passenger boarding bridge walkway and an aircraft exterior cabin door to permit passengers to board the aircraft from the walkway, the walkway having one end attached to a passenger terminal building and its opposite end extending out from the passenger terminal building, comprising: a first frame; a second frame attachable to the walkway opposite end in a manner to permit said frame to move in either lateral direction from the center and movable relative to the first frame; and, four panels including a floor panel, a ceiling panel, a first sidewall, and a second sidewall disposed for forming a passageway open at opposite ends, said passageway sized to permit a person to pass therethrough, at least a first of the four panels coupled to the first frame and at least a second of the four panels coupled to the second frame to support relative motion therebetween.

Additionally, the invention teaches a method of providing a continuous walkway between a terminal building and a passenger aircraft, comprising: providing an aircraft passenger boarding bridge disposed with one end of said aircraft passenger boarding bridge coupled to a terminal building to facilitate the movement of people between the passenger boarding bridge and the terminal building, providing an aircraft located and oriented within a working range of the passenger boarding bridge, orienting a cab section to correspond with the orientation of the door of the aircraft, moving the cab section of the passenger boarding bridge proximate a door of the aircraft, and adjusting the geometry of the cab section to correspond to the geometry of the door of the aircraft.

Another aspect of the invention teaches a cab for serving as a portal between an aircraft passenger boarding bridge walkway and an aircraft exterior cabin door to permit passengers to board the aircraft from the walkway, the walkway having one end attached to a passenger terminal building and its opposite end extending out from the passenger terminal building, comprising: a variable geometry extension having a variable geometry orifice, the variable geometry section including movable portions for, when moved, adjusting the cross sectional area of the variable geometry orifice proximate a door of the aircraft.

BRIEF DESCRIPTION OF THE DRAWINGS

Exemplary embodiments of the instant invention will now be described in conjunction with the following figures, in which:

FIG. 3a shows a side view of a first embodiment of the instant invention;

FIG. 3b illustrates a mode of operation of the first embodiment of the instant invention;

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein. In particular, the instant invention may be used in conjunction with a wide variety of passenger boarding bridge types, including but not limited to, apron drive bridges, pedestal bridges, over-the-wing (OTW) bridges and radial drive bridges.

Figure 1:
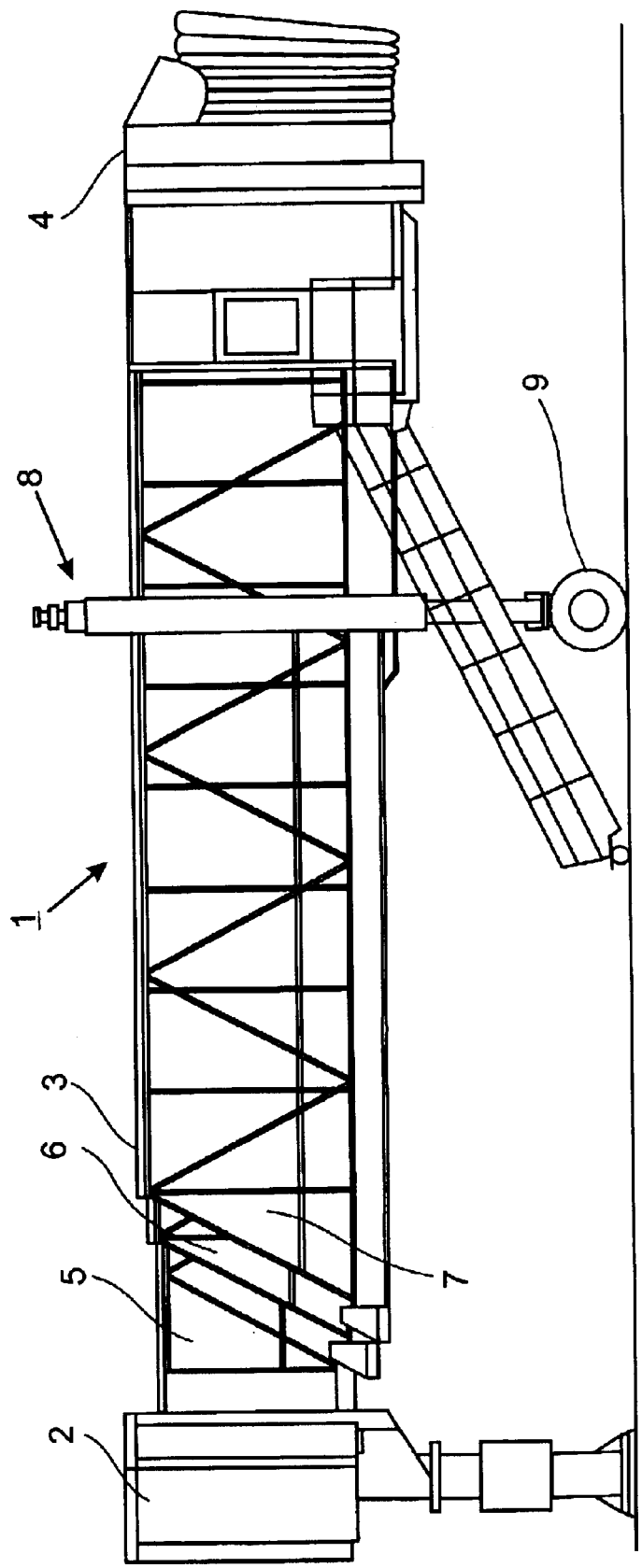
FIG. 1 shows a side elevational view of a passenger boarding bridge according to the prior art.

The reader will appreciate the instant invention, when viewed in the context of a conventional passenger boarding bridge. Referring now to FIG. 1 shown is a side elevational view of a passenger boarding bridge according to the prior art. The passenger boarding bridge 1 includes a stationary rotunda 2 from which extends a telescopic passageway 3 ending with a pivotal cabin 4 for mating to and providing a portal to a doorway of a not illustrated aircraft. The telescopic passageway 3 includes a first tunnel element 5, which is telescopically received within a second tunnel element 6, which in turn is telescopically received within a third tunnel element 7, such that the length of the telescopic passageway 3 is variable. The telescopic passageway 3 is supported near an outboard end thereof by a wheel carriage including at least a height adjustable support post 8 and ground engaging drive wheels 9. The drive wheels 9 are for achieving angular displacement and telescopic movement of the passageway 1. In use, the conventional passenger boarding bridge provides a continuous walkway between an airport terminal building and an aircraft.

Figure 2:
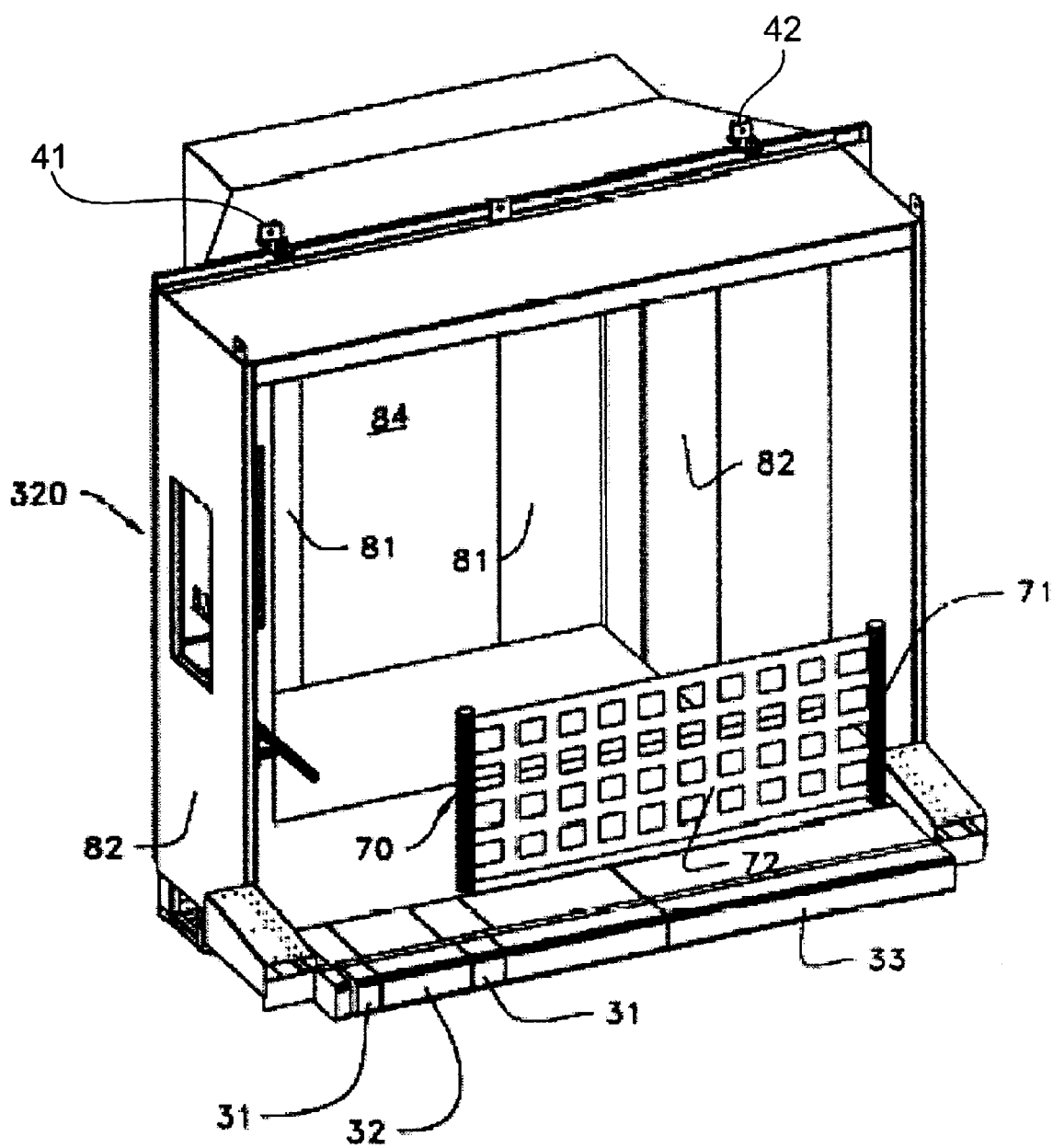
FIG. 2 shows a perspective view of a laterally adjustable passenger boarding bridge cab having retractable floor member according to the prior art.

Referring now to FIG. 2, shown is adjustable cab portion according to the prior art. Cab portion 320 preferably side shifts about fifty centimeters in each direction from the center. Cab portion 320 includes two rear wall portions 81 and two side wall portions 82. There is a window in one of the side wall portions 82 to allow an operator to easily view the airplane when maneuvering the cab portion 320. The rear wall portions 81 are preferably each wider than the distance that the cab portion 320 shifts in each direction so that there will never be an open space between the outside of the apron (not shown) and the interior of the cab portion 320. There is an opening 84 between rear wall portions 81 which allow passengers to enter the cab portion 320.

Further, the cab portion 320 comprises retractable floor members 31 and 32. Retractable floor member 32 can preferably move beyond the rest of the floor of cab portion 320 into the doorway of a commuter aircraft until it contacts the floor of the commuter aircraft. Retractable floor member 32 can retract so that it occupies a position inward of the end of the non-retractable portion 33 of the floor of cab portion 320, and can extend forward so that its end is beyond, and forward of the non-retractable portion 33 of the floor of cab portion 320 far enough to enter the doorway of a small commuter aircraft and contact the floor of the small commuter aircraft.

The cab portion 320 is optionally provided as part of an aircraft passenger boarding bridge as described with reference to FIG. 1. The cab portion 320 is connected to the passageway 3 of the loading bridge 1 by means of rollers 41 and 42. The rollers 41 and 42 provide lateral adjustability to the cab portion 320. Further, a safety barrier 70 helps to prevent people from walking off of the cab portion 320 of the present invention and not onto an aircraft when the cab portion 320 is used with a small plane or commuter jet. The safety barrier 70 comprises a webbing 72 supported by steel poles 71.

In FIG. 3, shown is a side view of a first embodiment of the instant invention. An adjustable cab portion 300 comprises a floor member 301, a fixed sidewall 302 fixedly attached and substantially perpendicular to the floor member 301, and a movable sidewall-roof construction 303. The sidewall-roof construction 303 comprises a sidewall part 303a substantially perpendicular to the floor member 310, and a roof part 303b fixedly attached and substantially perpendicular to the sidewall part 303a. Further, the movable sidewall-roof construction 303 comprises a set of rollers 304a and 304b attached to the sidewall part 303a opposite to an end of attachment of the roof part 303b for movably engaging the movable sidewall-roof construction 303 to the floor member 301. Also, the movable sidewall-roof construction 303 comprises a set of rollers 305a and 305b (not shown) attached to the roof part 303b opposite to an end of attachment of the sidewall part 303a for movably engaging the movable sidewall-roof construction 303 to the fixed sidewall 302. A set of rollers is not restricted to comprise two rollers, as illustrated in the example of the set of rollers 304a and 304b, but optionally comprises less than two or more than two rollers. The movable sidewall-roof construction 303 is movable in a direction substantially perpendicular to an extension of a passageway, to which the cab portion 300 is attached. Thus, the sidewall part 303a and the fixed sidewall 302, together with the floor member 301 and the roof part 303b, form an adjustable opening for aligning the cab portion 300 to a doorway of an aircraft.

Referring to FIG. 3b, a mode of operation of the adjustable cab portion 300 is illustrated. If, for example, the cab portion 300 is aligned with an aircraft doorway, such that the sidewall part 303a is positioned between the fixed sidewall 302 and an aircraft doorway 3003, the movable sidewall-roof construction 303 is laterally displaced so that the fixed sidewall 302 and the sidewall part 303a enclose the aircraft doorway 3003. The movable sidewall-roof construction 303 also allows for an adjustment of the size of the adjustable cab portion. If for example bulky objects are loaded to an aircraft, the size of the adjustable cab portion is possibly enlarged so as facilitate the boarding and deplaning of bulky objects. A person of skill in the art will foresee a variety of related situations, in which the advantages of the adjustable cab portion are utilized in a similar way.

Of course, this embodiment demonstrates a simple implementation of the invention. Clearly numerous other embodiments of the invention are possible. For example, in many cases, all that is desired is an embodiment with a movable sidewall.

Figure 4A:
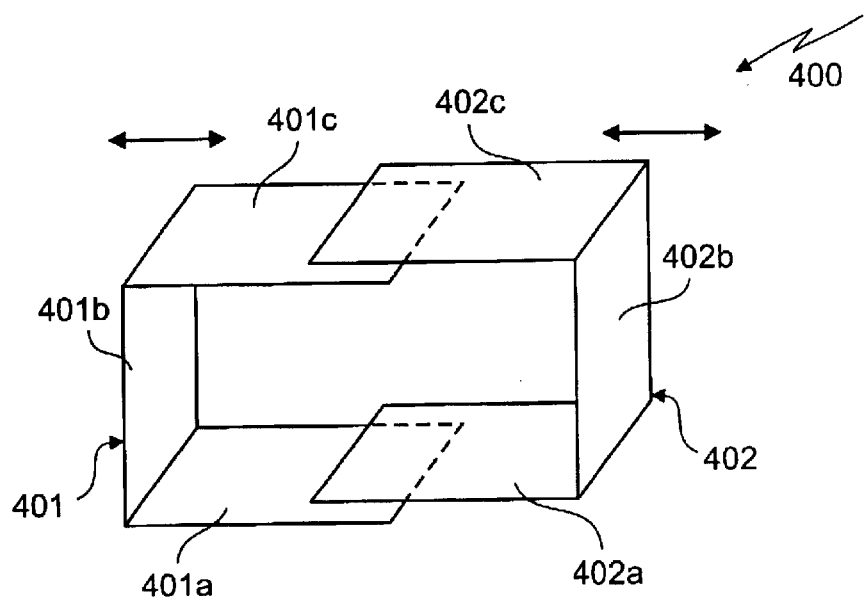
FIG. 4a shows a side view of a second embodiment of the instant invention.

Referring now to FIG. 4a, shown is a side view of a second embodiment of the instant invention. An adjustable cab portion 400 comprises two movable C-shaped frame members 401 and 402. The first frame member 401 comprises a floor section 401a, a sidewall section 401b and a roof section 401c, the sections positioned as to form the shape of a C. Similarly, The second frame member 402 comprises a floor section 402a, a sidewall section 402b and a roof section 402c, the sections positioned as to form the shape of a C. The two frame members 401 and 402 are positioned opposite to each other, so that floor section 401a and roof section 401c of the first frame member extend towards the sidewall section 402b of the second frame member, and vice versa. The two frame members are movably interleaved so as to form an adjustable cab portion 400 of variable size. The interleaving is for example done in a way that floor section 401a slides above floor section 402a, and roof section 401c slides below roof section 402c. Alternatively, floor section 401a slides below floor section 402a, and roof section 401c slides above roof section 402c. In another arrangement, floor section 401a slides above floor section 402a, and roof section 401c slides above roof section 402c. In yet another arrangement, floor section 401a slides below floor section 402a, and roof section 401c slides below roof section 402c.

Figure 4B:
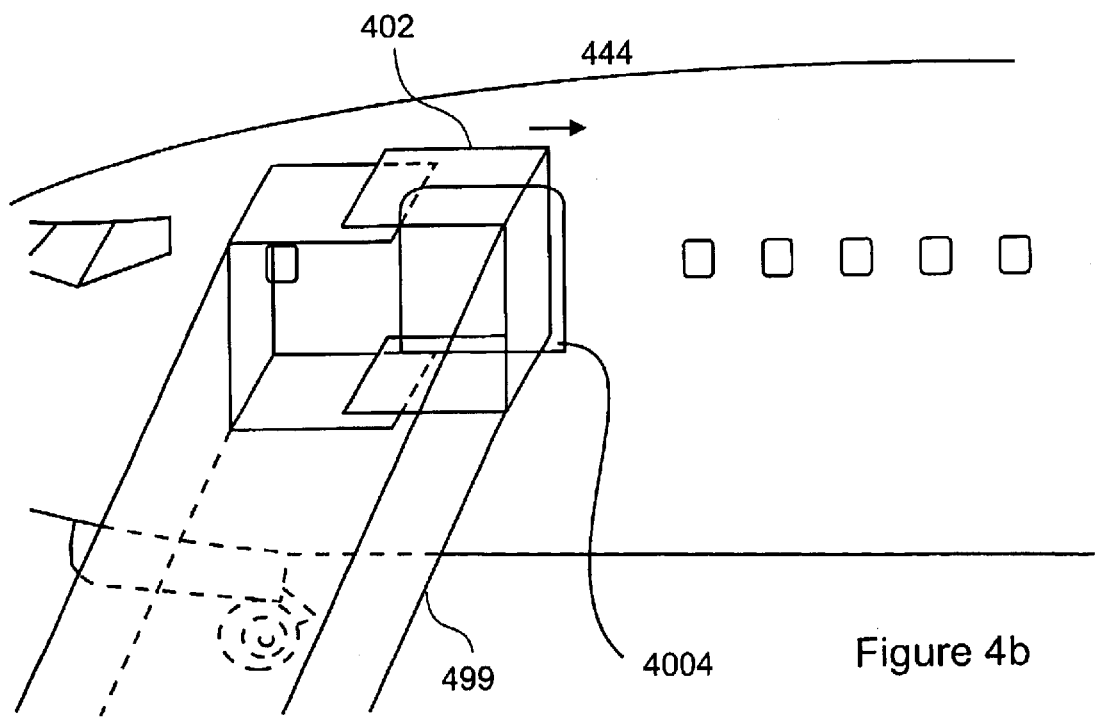
FIG. 4b illustrates a mode of operation of the second embodiment of the instant invention.

Referring to FIG. 4b, a mode of operation of the adjustable cab portion 400 is illustrated. A passenger boarding bridge comprises a passageway 499 and an adjustable cab portion 400 connected to the passageway 499. The passenger boarding bridge is docking to an aircraft, and the adjustable cab portion 400 is aligned with an aircraft doorway 4004. A first pre-alignment results in a coarse positioning of the cab, so that the doorway 4004 is not fully surrounding by the floor, roof, and sidewall members of the adjustable cab portion 400. This situation does not allow for a safe boarding and deplaning of passengers. In a fine alignment step, the second frame member 402 is laterally displaced in a direction 444 as to create a cab portion fully enclosing the doorway section of the aircraft. After the fine alignment, passengers can safely board and depart the aircraft.

Figure 5A:
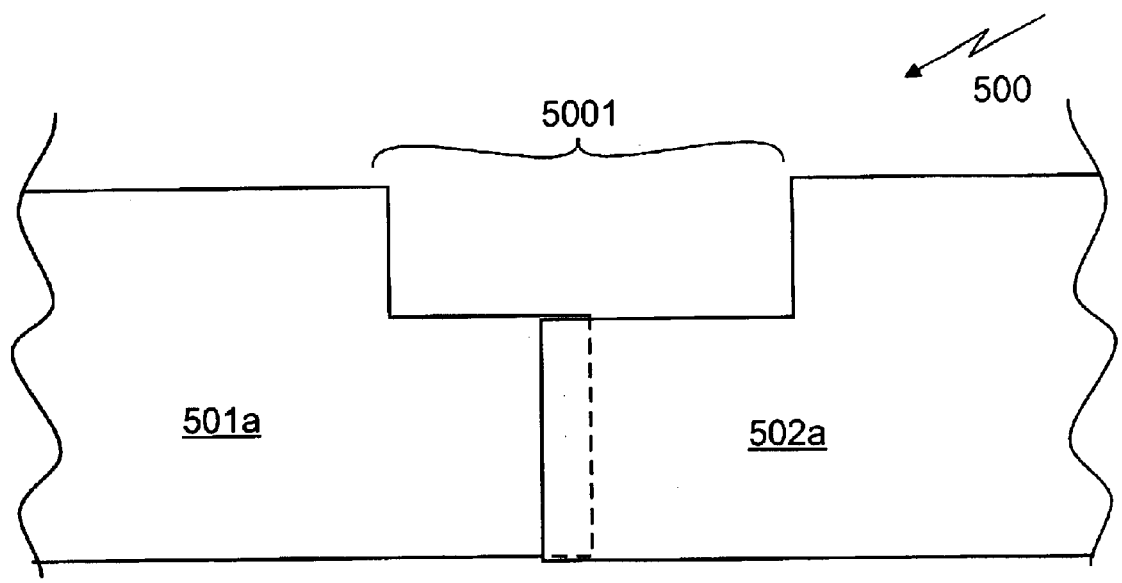
FIG. 5a shows a top view of a floor section of an adjustable cab portion according to a third embodiment of the instant invention, having extended floor members.
Figure 5B:
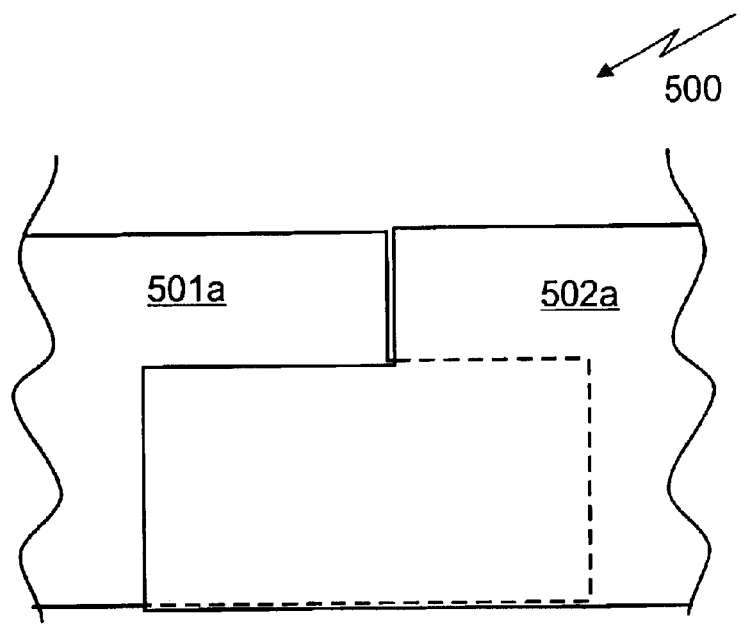
FIG. 5b shows a top view of a floor section of an adjustable cab portion according to a third embodiment of the instant invention, having contracted floor members.

Referring now to FIG. 5a, shown is a top view of an adjustable floor section according to a third embodiment of the instant invention. The adjustable floor section 500 is comprised of two floor sections 501a and 502a of two movable c-shaped frame members of the type described with reference to FIG. 4a The two floor sections 501a and 502a each have a notch at opposing ends and at a side pointed towards an aircraft, so that the adjustable floor section 500 contains an indentation 5001 at the leading edge, i.e. the side pointing to a doorway of an aircraft, when the two movable C-shaped frame members are in an extended state. When the two movable c-shaped frame members are in a contracted state, the side of the adjustable floor section formed by the two floor sections 501a and 502a does not contain an indention, as illustrated in FIG. 5b. The phantom lines in FIG. 5b illustrate how the two floor sections 501a and 502a interleave so as to form the adjustable floor section 500. The indentation is for example of use when the passenger boarding bridge comprising an adjustable cab portion is servicing an aircraft having automatically deploying stairways with a top step co-planar with the floor of the aircraft.

Figure 5C:
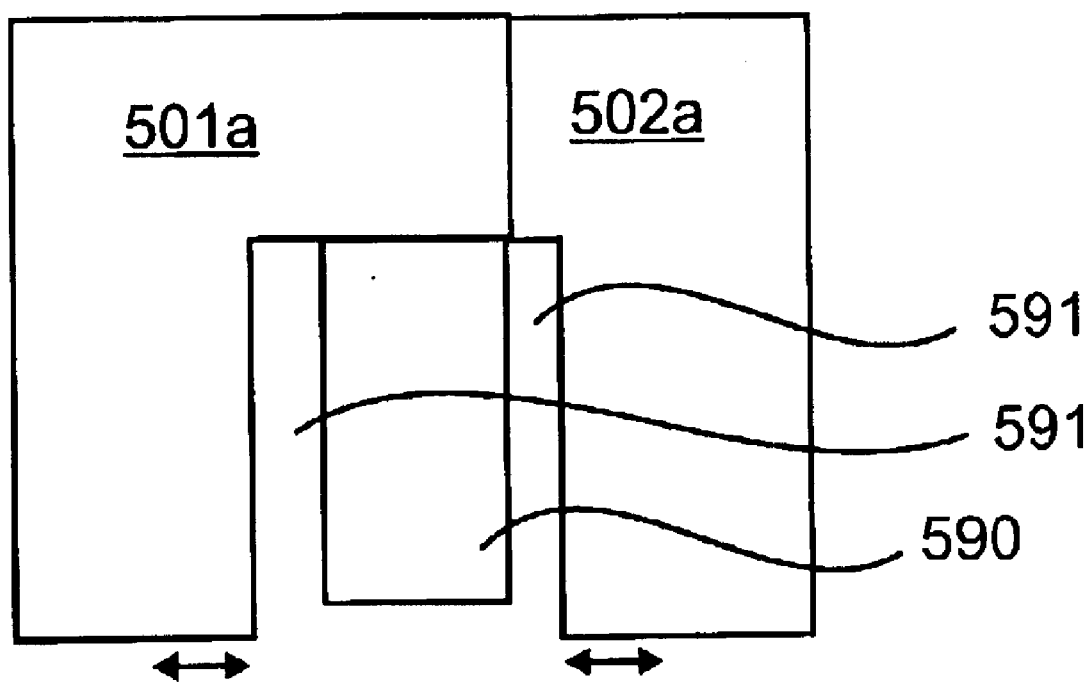
FIG. 5c is a simplified diagram of a floor section of a cab of a passenger boarding bridge in which the floor section permits docking with an aircraft having railings that deploy when the aircraft door is opened.

Referring to FIG. 5c, a top view of a floor section of an adjustable cab portion according to the invention is shown. This cab portion supports docking at a doorway having railings by providing a floor extension 590 that deploys between the railings. These railings deploy when the aircraft door is opened and therefore present an obstruction to docking with a conventional passenger boarding bridge. In order to accommodate an aircraft having doorways with self-deploying hand railings, the floor of the cab section includes apertures 591 on either side of a floor extension 590. The floor extension 590 is actuated to permit a variation in the length of the floor extension 590 in the direction of the floor extension axis 595. Thus, an aircraft having railings built into the aircraft door mechanism in which the first stair of the aircraft door mechanism is level with the floor of the aircraft is easily and safely docked with when the floor extension 590 is appropriately adjusted. Displacement of the floor sections 501a and 502a along axes 501b and 502b results in a corresponding change in geometry of the apertures 591. Thus, the apertures 591 are easily adjusted to be sufficiently wide to permit docking to the aircraft without interference. When such a cab is used to dock with an aircraft that does not have hand railings the floor sections 501a and 501b are brought sufficiently close together that the apertures 591 are closed. Optionally, the passenger boarding bridge includes sensors that sense the presence of the hand railings and provide data that assist in the positioning of the cab section of the passenger boarding bridge relative to features of the doorway of the aircraft.

Figure 6:
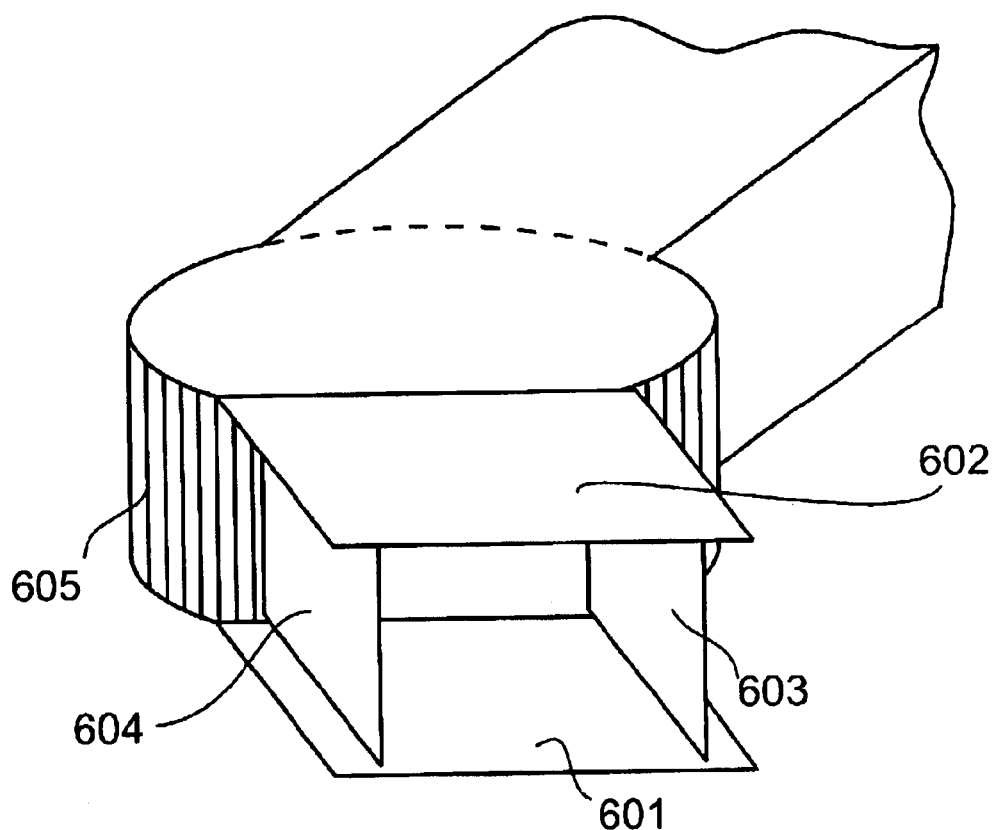
FIG. 6 is a simplified isometric view of a variable geometry cab according to the invention in which the floor panel and the ceiling panel are fixed relative to a frame and both side panels are independently positioned.

Referring to FIG. 6, a cab section of a passenger boarding bridge is shown. This cab section is configured according to another embodiment of the invention. This cab section features: a floor panel 601, a ceiling panel 602, a first sidewall 603 and a second sidewall 604. In this embodiment of the invention the ceiling panel 602 remains stationary relative to the floor panel 601. The first sidewall 603 and the second sidewall 604 are both independently adjustable. A flexible panel 605 is shown connecting the second sidewall 604 with rotational stage that supports the cab. This permits a wide variety of interior geometries for the cab section of the passenger boarding bridge. Since both sidewalls are adjustable it is a simple matter to adjust the locations of the first sidewall 603 and the second sidewall 604 to accommodate aircraft loading doors having different geometries in addition to compensating for imperfections in the alignment of the passenger boarding bridge relative to the aircraft loading door. In some cases it is preferable to reduce costs to enhance the structural strength of the cab section of the passenger boarding bridge. In this case, it is suggested that the second sidewall 604 be structurally fixed to both the floor panel 601 and the ceiling panel 602 to form a fixed panel. The first sidewall 603 moves relative to the fixed panel to adjust to different sized aircraft loading doors.

Figure 7:
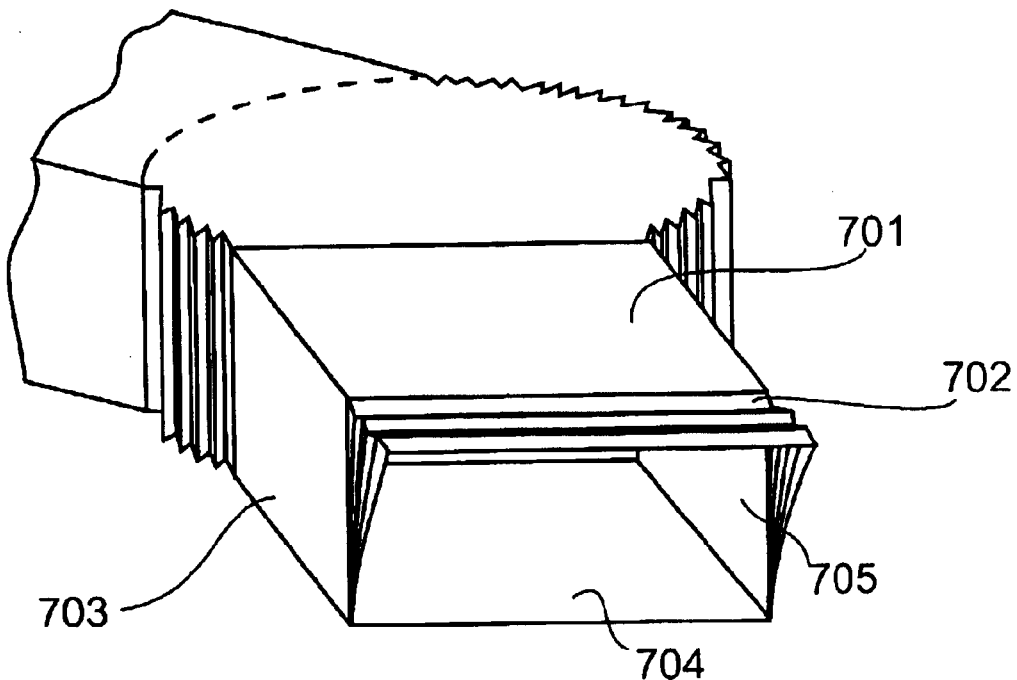
FIG. 7 is a simplified view of a passenger boarding bridge having a ceiling panel which extends to accommodate different geometries of aircraft.
Figure 7A:
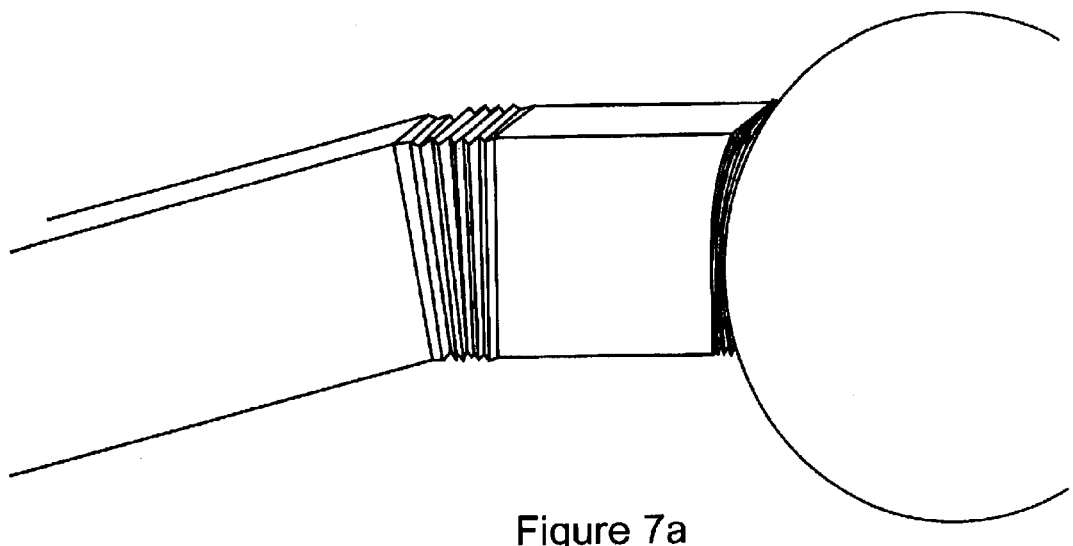
FIG. 7a is a cross section view of the passenger boarding bridge according to FIG. 7 shown coupled to a large aircraft.
Figure 7B:
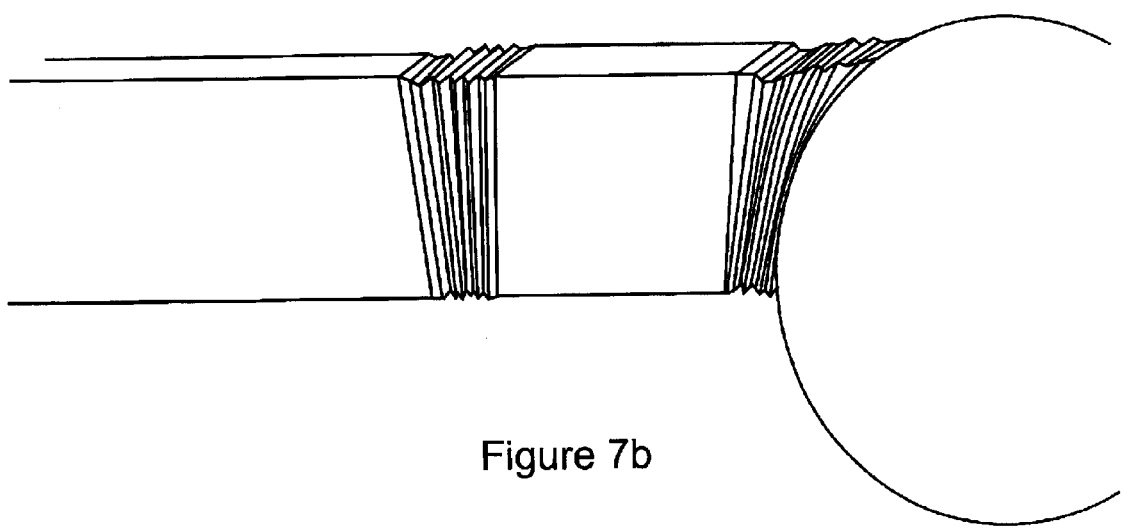
FIG. 7b is a cross section view of the passenger boarding bridge according to FIG. 7 shown coupled to a small aircraft; and, FIG. 8 is simplified design diagram of a canopy for a passenger boarding bridge that supports changes in length and width.

Referring to FIG. 7 an alternative embodiment of the invention is shown. FIG. 7 shows a passenger boarding bridge cab having a ceiling panel 701, a first sidewall 703, a floor panel 704 and a second sidewall 705. The ceiling panel 701 features an extension 702 and a mechanism that supports docking of the cab with aircraft of different sizes. In use, the cab of the passenger boarding bridge is positioned proximate an aircraft loading door and the adjustable section is adjusted laterally relative to the aircraft loading door. Referring to FIG. 7a, this alternative embodiment of the invention is shown mating to a large aircraft. The body of the large aircraft is sufficiently large that the extension 702 is only partially deployed. The ceiling of the cab portion is positioned relative to the surface of the aircraft. Referring to FIG. 7b the same cab section is shown mating to a smaller aircraft. The body of the small aircraft has a substantially smaller radius of curvature proximate an aircraft loading door in comparison with similar features of the larger aircraft described with reference to FIG. 7a. The ceiling panel 701 includes an extension mechanism that permits the ceiling panel 701 to extend perpendicular to the lateral direction to the body of the small aircraft and form a seal thereon above the aircraft loading door. A person of skill in the art will be aware that it is possible to have the ceiling panel support motion in a plurality of different directions. In this case the ceiling panel is said to support motion having more than one degree of freedom relative to the cab. Unfortunately, supporting this type of motion typically involves a set of additional structural elements, and actuators for each supported degree of freedom in addition a more complex control system for controlling the cab. Consequently, it is preferable to minimize the degrees of freedom of the various panels. Thus, the embodiment of FIG. 7 is highly advantageous because it permits lateral adjustment of the passenger boarding bridge cab while also permitting extension of the ceiling to mate with the aircraft absent making the cab design too complex and expensive.

The adjustable cab portions described above are constructed as to serve a variety of different airplanes, while allowing for a sufficient amount of passenger safety in order to provide for safe and secure boarding and deplaning of passengers. Additional safety measures such as a safety barrier are generally not needed.

The cab portions described in the context of the instant invention are preferably movably attached to a passageway of a passenger boarding bridge to allow for a lateral displacement of the movable portions of the adjustable cab portion in a direction substantially perpendicular to an extension of a passageway. Also, the cab portions of the instant invention are optionally equipped with electric motors or other devices providing for locomotion of the movable parts of the cab portion. A person of skill in the art will easily envision ways how the concepts illustrated in the context of adjustable cab portions are brought into reality.

Figure 8:
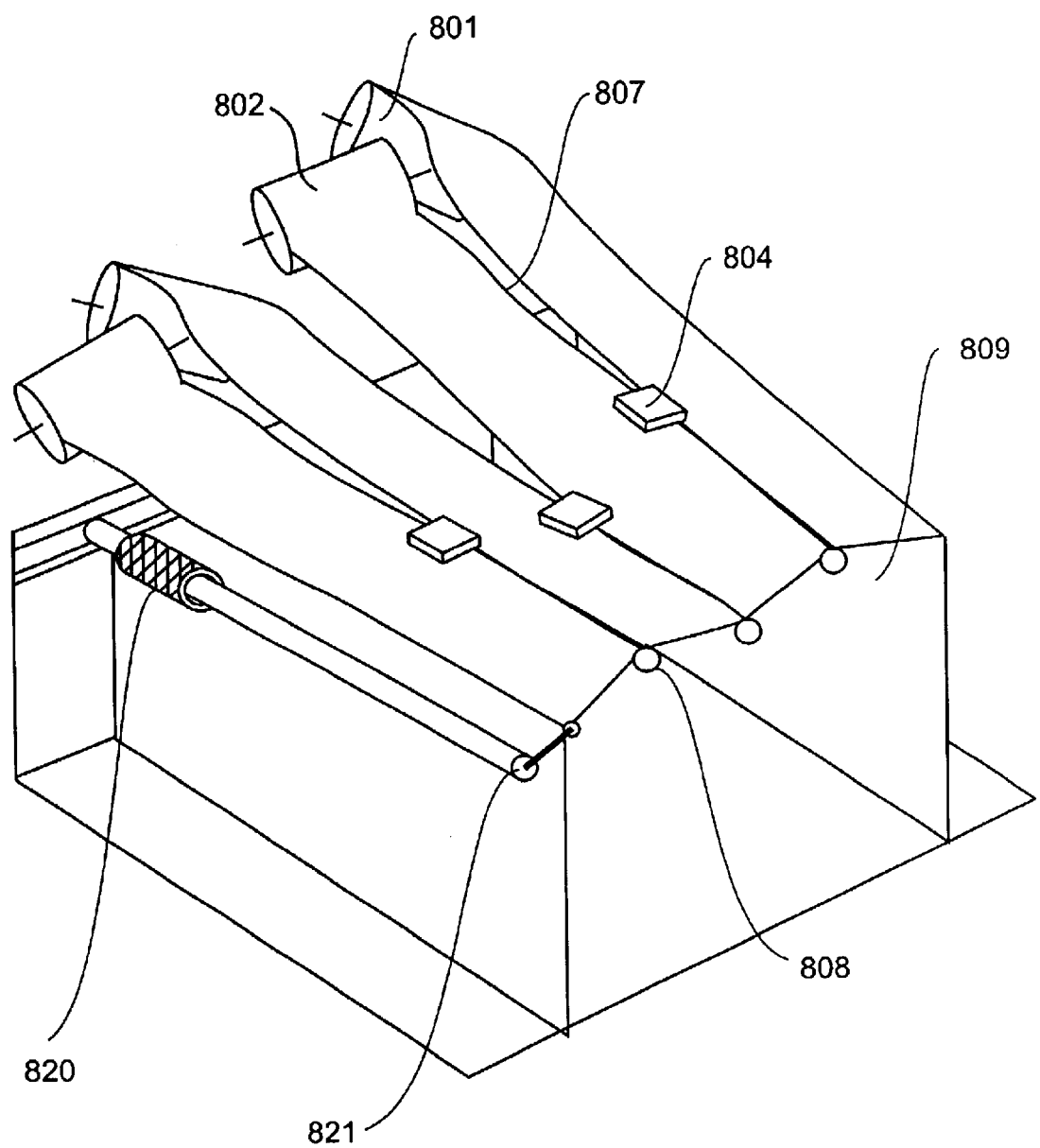

The embodiments described hereinabove will likely make use of variable geometry sections. Referring to FIG. 8 an example design of a canopy roof for a passenger boarding bridge is shown. The canopy roof supports variations in width and length. This design for such a canopy includes a structure for supporting a set of rolls 801 of canopy material 802. The rolls 801 feature a mechanical engaging feature 807 on both edges of the canopy material of the roll 801. The canopy material of each of the rolls is connected to an adjacent roll via the mechanical engaging feature 807. The rolls are designed to work together to provide or retract the canopy material. The mechanical engaging features 807 function in a manner analogous to clothing zipper. Specifically, as the canopy material is drawn out of the roll 801 the mechanical engaging feature 807 of a first roll is fed through a combiner 804 and engaged with a mechanical engaging feature 807 of a second roll. When the canopy is withdrawn, the rolls retract the canopy material and the mechanical engaging features are fed through combiners 804 which now act to separate the engaged mechanical engaging features 807. This permits the canopy material 802 to be rolled without the material overlapping within the roll. The canopy material is supported by rails 808. When the canopy widens the rails 808 separate uniformly thereby preventing sagging of the canopy. The edge of the canopy is held by a receiving feature proximate the top surface of each of the sidewalls 809. The sidewalls 809 are independently actuated, although this need not be the case. The extreme edges of the canopy engage with features proximate the top of the sidewalls 809. These features permit sliding contact between the canopy and the sidewalls 809. Actuator 820 engages a rod 821, the end of the rod is coupled to the canopy. The actuator 820 displaces the rod 821 in response to an external control signal. Thus, the rod 821 is actuated to pull the canopy beyond the edge of the sidewalls 809. The design described by FIG. 8 features four rolls 801; however, other configurations consistent with the teaching of FIG. 8 optionally feature a different number of rolls 801. Indeed, a person of skill in the art of mechanical design will be aware of numerous other modifications.

The design presented by FIG. 8 is intended to illustrate one mechanism that provides a canopy of variable length and width as described by embodiments of the invention described hereinbefore. Other designs having similar functionality will be apparent to those of skill in the art.

A person understanding this invention may now conceive of alternative structures and embodiments or variations of the above all of which are intended fall within the scope of the invention as defined in the claims that follow.

What is claimed is:

1. A cab for serving as a portal between an aircraft passenger boarding bridge walkway and an aircraft exterior cabin door to permit passengers to board the aircraft from the walkway, the walkway having one end attached to a passenger terminal building and its opposite end extending out from the passenger terminal building, the cab comprising:

a passageway including a floor, a ceiling opposing the floor, a first sidewall, and a second sidewall opposing the first sidewall, the passageway sized to permit a person to pass therethrough and having a first opening for coupling to the walkway opposite end, and a second opening defined by edges of the floor, the ceiling, the first sidewall, and the second sidewall for being positioned in a direction toward the aircraft exterior cabin door;

a second frame coupled to the first sidewall; and a first frame coupled to at least one of the floor, the ceiling, and the second sidewall, wherein at least one of the first and second frames are for being attached to the walkway opposite end in a manner to support lateral movement of the second frame relative to the walkway opposite end and relative to the first frame, so as to permit lateral movement of the first sidewall relative to the at least one of the floor, the ceiling, and the second sidewall.

2. A cab according to claim 1 wherein the first frame is fixed relative to the walkway along the direction of lateral movement.

3. A cab according to claim 2 wherein, the ceiling is coupled to the first frame such that the ceiling is substantially prevented from moving relative to the first frame along the direction of lateral movement.

4. A cab according to claim 3 wherein the ceiling is disposed for extension and retraction along an axis approximately perpendicular to the direction of lateral movement.

5. A cab according to claim 4 wherein the first sidewall and the second sidewall are fixed to the second frame.

6. A cab according to claim 5 wherein the floor is fixed to the second frame.

7. A cab according to claim 1 wherein, the second sidewall is fixed to the first frame and the first sidewall is fixed to the second frame.

8. A cab according to claim 7 wherein, the first sidewall comprises a lateral extension disposed parallel and proximate to the floor and extending toward the second sidewall and the second sidewall comprises a lateral extension disposed parallel and proximate to the floor and extending toward the first sidewall.

9. A cab according to claim 8 wherein, the floor includes a step feature and the first sidewall and the second sidewall are selectably disposed to one of expose the step feature and cover the step feature.

10. A cab according to claim 7 wherein the floor is fixed to the first frame.

11. A cab according to claim 10 wherein the ceiling is fixed to the first frame.

12. A cab according to claim 10 wherein the ceiling is fix to the second frame.

* * * * *